United States Patent

Strub

[15] 3,637,079
[45] Jan. 25, 1972

[54] FILTER AND METHOD OF CLEANING THE FILTER

[72] Inventor: Fritz Strub, St. Gallen, Switzerland
[73] Assignee: Filtrox-Maschinenbau AG. Sittertobel, St. Gallen, Switzerland
[22] Filed: July 2, 1968
[21] Appl. No.: 742,047

[30] Foreign Application Priority Data

July 12, 1967  Switzerland ..................9964/67

[52] U.S. Cl. ..........................210/82, 210/333, 210/456
[51] Int. Cl. .................................B01d 27/12, B01d 29/32
[58] Field of Search...................210/82, 258, 333, 411, 412, 210/456

[56] References Cited

UNITED STATES PATENTS

| | | | |
|---|---|---|---|
| 1,214,152 | 1/1917 | Genter | 210/412 X |
| 2,780,363 | 2/1957 | Pew | 210/82 |
| 3,029,948 | 4/1962 | McKay | 210/412 X |
| 3,109,809 | 11/1963 | Verrando, Jr. | 210/456 X |
| 3,169,109 | 2/1965 | Hirs | 210/456 X |
| 3,225,933 | 12/1965 | Berline | 210/333 |
| 3,280,978 | 10/1966 | Scott | 210/333 X |

Primary Examiner—Samih N. Zaharna
Attorney—Watson, Cole, Grindle & Watson

[57] ABSTRACT

A filter apparatus and method for cleaning a filter having at least one filter element with a separate container connected by a feed pipe to the outlet side of the filter apparatus and a stop valve in the feed pipe and means for causing a gaseous medium under excess pressure to displace a cleaning fluid from the container into the filter apparatus.

10 Claims, 3 Drawing Figures

INVENTOR.
Fritz Strub

FILTER AND METHOD OF CLEANING THE FILTER

The invention relates to a process for cleaning a filter apparatus with built-in filters, as well as to an apparatus for carrying out this process.

In a known process for cleaning a filter apparatus, the sludge deposited on the filter, at the inlet side of the filter apparatus, is removed from the filter by filling the interior at the inlet side, as well as that part of the interior of the filter apparatus which is at the outlet side above the interior at the inlet side, with water from the inlet side, the outlet side being closed, whereby the air above the water is compressed in the interior at the outlet side of the filter apparatus. After introducing the water and compressing the air in the upper part of the outlet side of the interior of the filter apparatus, a drainage pipe is suddenly opened at the inlet side of the filter apparatus, so that the compressed air causes an intensive backflow of the water in the outlet side of the interior through the filter and the sludge deposited at the inlet side of the filter is thus released and mixed with the water in the inlet side of the interior and then removed from the filter apparatus through the drainage pipe.

This process is relatively simple, but has a definite disadvantage: The sludge loosened from the filter is mixed, in this process, with a volume of water which is approximately equal to the total volume of the spaces at the inlet and outlet sides of the filter apparatus. Since this water mixed with the sludge should not be passed into the drainage system in this form, a complicated separation of the sludge from the water, e.g., by decantation, is still required, which involves considerable cost. In decantation of the water, large drainage tanks, for example, are necessary, which lead to a relatively high installation cost and not inconsiderable maintenance costs.

A further important disadvantage of this known process is that the volume of the outlet side of the interior of the filter apparatus must be relatively large, in order that a sufficiently large body of air, for producing the intensive backflow of water through the filter, can form in the outlet interior and in order that the rise in pressure of the air enclosed above the water is neither too great nor is the final pressure of the air volume in the outlet interior too high. It is therefore necessary to avoid too high a final pressure, because the filling pressure of the water introduced from the inlet side must correspond to the counterpressure of the air and, as a rule, the maximum amount of this filling pressure is restricted.

The relatively large volume of the outlet interior of the filter apparatus, necessary in the known process for these reasons, predicates a relatively large overall height of the filter apparatus, which for reasons of space is disadvantageous and frequently does not even enable a filter apparatus, which has to be cleaned by this known process, to be installed in existing systems.

The invention is based on the problem of finding a method for cleaning a filter apparatus with built-in filters and of providing a device for carrying out this method, whereby the aforesaid disadvantages of the known process can be avoided.

This is achieved with a method for cleaning a filter apparatus in accordance with the invention in which a cleaning fluid is subjected to excess pressure in a separate container and, for carrying out the cleaning operation, is supplied through a feedpipe to the outlet side of the filter apparatus and is then forced out from there through the filter in the opposite direction to the filter apparatus, a gaseous medium under elevated pressure being used for supplying the cleaning fluid from the separate container to the filter apparatus, which gaseous medium displaces the cleaning fluid from the container via a feedpipe to the filter apparatus and then through the filter and is itself partly forced through the filter owing to its elevated pressure.

In a preferred embodiment of the present method, before carrying out the cleaning operation, the separate container with the feedpipe closed is filled partly with the cleaning fluid and partly with the gaseous medium at excess pressure, and the feedpipe is then opened for carrying out the cleaning operation.

In another preferred embodiment of the present method, before carrying out the cleaning operation, the separate container with the feedpipe closed is completely or partially filled with the cleaning fluid, which is then heated to a temperature above its boiling point at normal pressure and is thereby subjected to elevated pressure and, for carrying out the cleaning operation, the feedpipe is then opened, whereby the pressure of the cleaning fluid drops, a part of the fluid is thereby vaporized in the separate container and this vapor then forms the gaseous medium which supplies the cleaning fluid to the filter apparatus.

In both embodiments, the cleaning fluid is preferably water and, in the first-mentioned embodiment, air is preferably used as the gaseous medium.

The invention further relates to a device for carrying out the present method, comprising a filter apparatus having at least one filter, a separate container, a feedpipe leading from the container to the outlet side of the filter apparatus, a stop valve in the feedpipe and means for enabling a gaseous medium located under excess pressure in the container to supply fluid which has entered the container to the filter apparatus.

The filter can be a candle filter with a plurality of filter candles, which are provided with means for distributing the cleaning liquid, which during the cleaning operation flows from the outlet side of the filter apparatus into the interior of the candles, to the inner surface of the permeable, filtering part of the candle.

The means for distributing the cleaning fluid each suitably comprise a nozzle-shaped constriction attached to the outlet side of the end of the candle and a deflecting body attached at a distance from this constriction in the interior of the candle, which body deflects the cleaning fluid, which during the cleaning operation flows through the nozzle-shaped constriction in the form of a jet, to all sides in the direction of the inner walls of the candle, whereby an annular closed-loop gap is provided between the deflecting body and the inner wall of the candle, down through which the cleaning fluid, distributed along the inner wall of the candle by the deflecting body, can run.

In an alternative arrangement, the means for distributing the cleaning fluid can also suitably consist of a nozzle tip mounted at the outlet end of the candle so as to project into the candle and having a number of nozzle openings directed towards the inner wall of the candle surrounding the nozzle tip.

Embodiments of the invention are explained in the following with reference to the accompanying drawings, in which.

Figure 1:
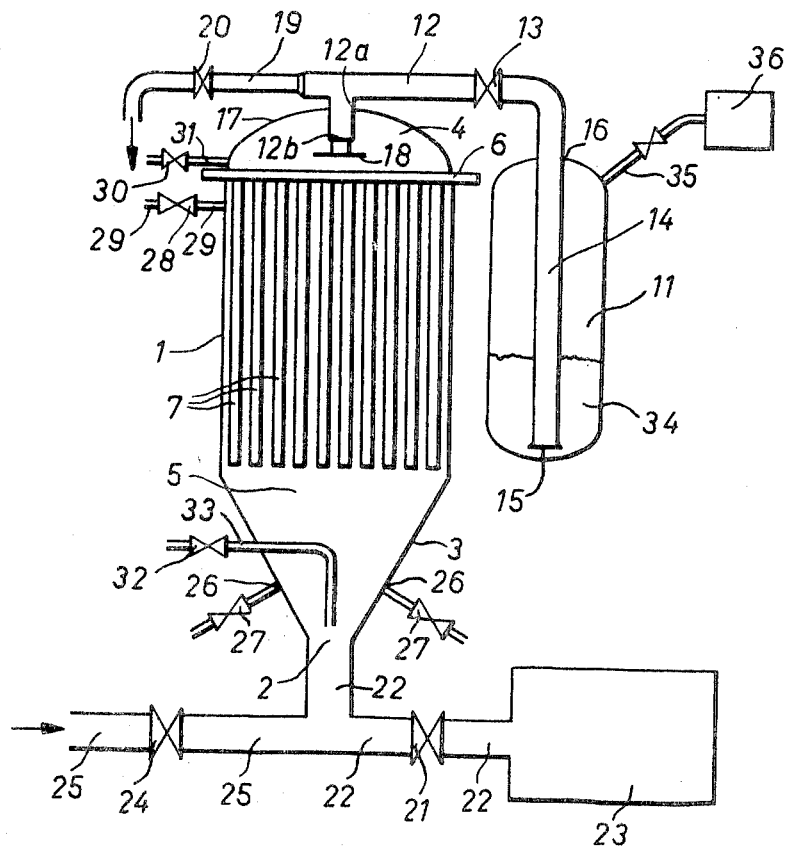
FIG. 1 is a diagrammatic view illustrating a filter apparatus for carrying out the method according to the invention.
Figure 2:
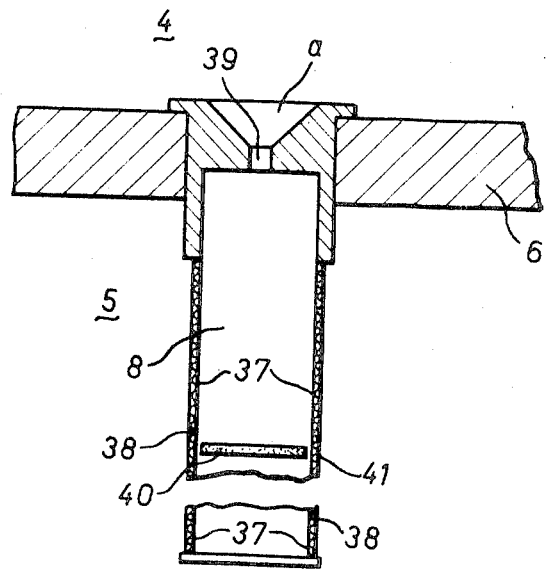
FIG. 2 is a vertical section through a filter candle suitable for the apparatus according to FIG. 1.
Figure 3:
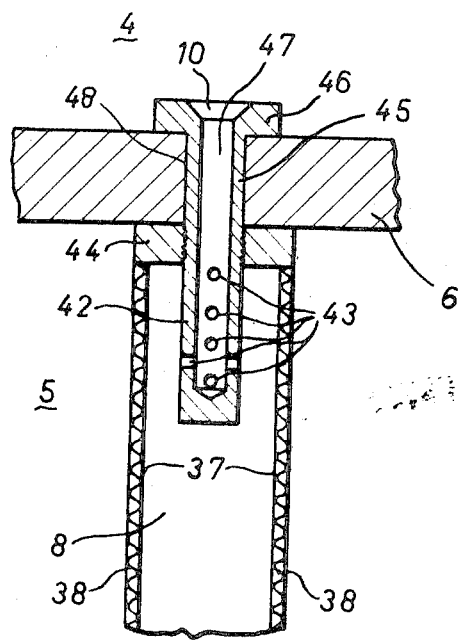
FIG. 3 is a vertical section through another embodiment of a filter candle suitable for the filter apparatus according to FIG. 1.

The filter apparatus according to the invention illustrated in FIG. 1 is incorporated in an upright tank 1, which has a funnel-shaped base 3 provided at the end of the funnel with an opening 2 and a wallplate 6 arranged horizontally so as to divide the interior of the tank 1 into an upper volume 4 and a lower volume 5. Filter candles 7 which in their entirety form the filter are attached to the wallplate 6 and hang vertically in the lower volume 5. The interiors 8 of the filter candles 7, as is apparent from FIGS. 2 and 3, are connected to the upper volume 4 by openings 9, 10 through the wallplate 6. The upper volume 4 forms the outlet side of the filter apparatus and the lower volume 5 forms the inlet side. A separate container 11 is connected with the upper volume 4 by a feedpipe 12 having a stop valve 13 mounted therein. The feedpipe 12 is attached, at the container side, to a drainage pipe 14 whose outlet opening 15 is located near the bottom of the container 11. The drainage pipe 14 is formed from a standpipe which is led through the container wall at the top 16 of the container 11. The feedpipe 12 runs from the container 11 to a tube 12a, which enters a tank cover 17 centrally, passes into the upper volume 4 of the filter apparatus and opens out at an orifice 12b. A deflecting plate 18 is attached in front of the orifice 12b. An outlet pipe 19 is attached to the feedpipe 12, above the cover 17 of the tank, and runs via a stop valve 20 to a collecting tank, not shown, for the fluid filtered in the apparatus. A pipe 22, which can be shut off by a stop valve 21, is fixed to the opening 2 at the bottom of the funnel at the base 3 or the tank 1, and the sludge accumulated during the process together with the cleaning fluid is delivered by way of this pipe 22 to a conveying container 23. A feedpipe 25 including a stop valve 24, for supplying the fluid which is to be filtered into the filter apparatus, is fixed to the pipe 22 below the opening 2 at the bottom of the funnel at the base 3 of the tank 1. Several nozzles 26 are fixed on the funnel wall at the base 3 of the tank 1 and serve for feeding air or gas into the lower volume 5 of the filter apparatus. The nozzles 26 can either be shut off by one common valve, or, as shown in FIG. 1, by separate valves 27. For regulating the flow of gas or air through the nozzles 26, the valves 27 are preferably adjustable, e.g., by being made as reducing valves. A gas pipe 29 which can be shut off by means of a valve 28 opens into the lower volume 5 of the filter apparatus near the wallplate 6 and serves for feeding the air, on emptying the filter apparatus before carrying out the cleaning operation, as well as for drawing off gas from the lower volume 5 during the cleaning operation. An outlet pipe 31 including a valve 30 opens into the upper volume 4 of the filter apparatus at the wall plate 6 or in the vicinity thereof and serves for drawing off the already filtered fluid from the upper volume 4, as the apparatus is emptied, before the cleaning operation is carried out. Furthermore, a pipe 33 including a valve 32 opens into the funnel formed by the base 3 of the tank 1 and serves for drawing off fluid, which has not yet been filtered, from the lower volume 5 as the filter apparatus is emptied before the cleaning operation is carried out.

Furthermore, in the filter apparatus shown in FIG. 1, means are provided to enable a gaseous medium which is under excess pressure in the container 11 to supply a cleaning fluid 34, which has been fed into the container 11, to the filtering device. These means can consist of either a compressed air unit 36 which can be connected with the container 11 by a closable pipe 35, as indicated in FIG. 1, or of a heating device, not shown in FIG. 1, for heating the cleaning fluid in the container 11 to a temperature above its boiling point at normal pressure.

With the filter apparatus according to the invention shown in FIG. 1, the cleaning process according to the invention is as follows:

The starting point for the present example of the cleaning process is the end of the previous filtering process. At this moment, the fluid to be or already filtered is still in the entire filter apparatus, namely the fluid still to be filtered is in the lower volume 5 of the apparatus as well as in the inlet pipe 25 and the section of the pipe 22 between the stop valve 21 and the lower opening 2 of the tank 1, and the fluid already filtered is in the upper volume 4 of the apparatus. Shortly before the end of the filtering process, the valves 20 and 24 are opened and all other valves, 13, 21, 27, 28, 30 and 32 are closed.

At the end of the filtering process, the valve 24 in the feedpipe 25 is closed, while the valve 20 in the outlet pipe 19 of the filter apparatus remains open. The valve 28 in the gas pipe 29 is opened and air is injected under excess pressure through the gas pipe 29 to the lower volume 5 at the inlet side of the filter apparatus. This air injected by the gas pipe 29 builds up beneath the wallplate 6 and simultaneously passes from the outside through the walls of the filter candles 7 into the interiors of the filter candles, see FIGS. 2 and 3, and from there flows out through the openings 9, 10 in the wallplate 6, see FIGS. 2 and 3, into the outlet upper volume 4 of the filter apparatus. A drop in pressure in the filter apparatus occurs above the filter candles 7, due to the air flowing from the outside through the walls of the filter candles towards their inner sides 8, so that the sludge which has accumulated on the outsides of the filter candles 7, during previous filtering, remains on the filter candles. The air which passes through the openings 9, 10, see FIGS. 2 and 3, into the outlet upper volume 4 then accumulates under the dome-shaped cover 17 of the tank 1 and forces the fluid, which has already been filtered, out of the upper volume 4 on the outlet side of the filter apparatus by way of the tube 12a passing through the tank cover 17 as well as the outlet tube 19 and the valve 20, which is still open, until the level of the fluid lies near the aperture 12b of the tube 12a. The valve 20 in the outlet pipe 19 is closed at this moment at the latest, after the valve 30 in the outlet pipe 31 has been opened. The fluid already filtered but still present in the outlet upper volume 4 is then displaced from the upper volume 4 through the pipe 31 by means of the additional air pressure built up in the dome-shaped tank cover 17 and is likewise fed to the aforesaid collecting tank, not shown. As soon as the level of the already filtered fluid present in the upper volume 4 has reached the height of the orifice of the outlet pipe 31, and thus nearly the height of the wallplate 6, and air emerges from the other orifice, not shown, of the outlet pipe 31, the cross-sectional area of the valve aperture 30 is decreased after the valve 32 in the pipe 33 has been opened. The cross-sectional area of the valve aperture 30 is thereby adjusted so that a part of the air admitted to the lower chamber 5 via the gas pipe 29, preferably 50 percent at the most thereof, flows out through the outlet pipe 31. Furthermore, the cross-sectional area of the aperture of the valve 32 is adjusted so that a drop in pressure occurs above the valve 32, which is greater than the pressure of the column of liquid between the height of the valve 32 and the wallplate 6, and that preferably by a pressure difference of over 50 percent of the excess pressure of the air supplied through the gas pipe 29. The valves 30 and 32 are suitably formed as reducing valves for the purpose of these adjustments. By the described adjustments of the valves 30 and 32, a portion of the air supplied through the gas pipe 29 to the inlet lower volume 5 of the filter apparatus succeeds in flowing out via the valve 30 and, accordingly, an airflow or current is maintained from the inlet lower chamber 5 through the filter candles 7 towards the outlet upper volume 4, which air current causes a pressure drop in the filter apparatus above the filter candles 7 so that the sludge attached to the outsides of the candles remains upon them. The adjustment described of the valve 32 thereby serves to prevent the fluid in the inlet lower chamber 5 of the filter apparatus from flowing out too quickly, since, with an insufficiently quick followup of air through the gas pipe, such a quick drain-off, which could arise by reason of the pressure of the liquid head between the top of the valve 32 and the level of the fluid still in the lower chamber 5, could lead to an air current from the upper outlet chamber 4 towards the lower inlet chamber 5 of the filtering apparatus, whereby a fall in pressure would then occur above the filter candles 7 in the opposite direction to the filter and thus also the sludge on the filter candles 7 might be partially loosened. That portion of the whole air supplied through the gas pipe 29 which portion does not flow out through the pipe 31, this portion now accumulates, after the outlet upper chamber 4 is emptied and filled with air, in the inlet lower chamber 5 of the filtering apparatus beneath the wallplate 6 and forces the fluid not yet filtered but still in the inlet lower chamber 5 out of the filter apparatus via the drainage pipe 33 and the valve 32. The valve 32 can therewith be gradually opened more and more as the level of the effluent fluid drops, and that so that the sum of the pressure drop above the valve 32 is always greater than the sum of the pressure of the column of liquid between the height of the valve 32 and the level of the effluent fluid, and of 50 percent of the excess pressure of the air supplied via the gas pipe 29. However such an adjustment of the valve 32, while the fluid in the lower chamber 5 is flowing out, is not, absolutely necessary and may be dispensed with if a decrease in the velocity of waste flow with the lowering of the level of the fluid in the lower chamber is acceptable.

As soon as the level of the waste fluid reaches the level of the opening of the drainage pipe or the outlet of the drainage pipe 33 into the lower chamber 5 and air begins to flow out through the valve 32, the valve 32 is closed. The level of the outlet opening or of the outlet of the drainage pipe 33 into the lower chamber 5 lies somewhat above the opening 2 at the bottom of the funnel of the base 3 of the tank. There is a good reason for this, in that during the filtering process larger portions of sludge, whose force of gravity is greater than the upward force of flow, collect at the base 2 of the funnel within the tube 22 attached thereto, and those larger portions of sludge should, of course, not drain off again through the drainage pipe 33.

The filter apparatus is emptied when the valve 32 is closed and the filter candles can now be cleaned from the attached sludge. The supply of air through the gas pipe 29 is then stopped and the gas pipe 29 switched over by means of a two-way cock, not shown in FIG. 1, so that the inlet lower chamber 5 of the filter apparatus is joined by the gas pipe 29 with the outer atmosphere or a chamber in which approximately atmospheric pressure prevails. The valve 28 thus remains opened. If required, the cross section of the aperture of the valve 28 can even be increased. At the same time as the gas pipe 29 is switched over, the valve 30 is closed.

While the filter apparatus is being emptied or even while the preceding filtering operation is being carried out, a fluid 34, preferably water, possibly with bactericidal or other cleansing additions, which have been introduced into the container 11, is brought to excess pressure either by supplying compressed air to the part of the container 11 not filled by the cleaning fluid, with the help of the compressed air unit 36 attached to the container 11 by the pipe 35, or by heating the cleaning fluid to a temperature above its boiling point at normal pressure with the aid of a heating device, not shown in FIG. 1.

The following may be mentioned in regard to the preparations concerning carrying out the cleaning operation:

In the case where the cleaning fluid 34 is brought to excess pressure by means of compressed air, as with the embodiment of a device for carrying out the present process shown in FIG. 1, the final pressure $p$ of the compressed air in the container 11 and the charging factor $q=V_R/V_B$ of the container 11 with cleaning fluid, corresponding to the ratio of the volume $V_R$ occupied by the cleaning fluid in the container to the total volume $V_B$ of the container 11, are selected so as to be dependent on each other and on the volume ratio $k=V_F/V_B$ of the volume $V_F$ of the entire outlet side of the filter apparatus including the feedpipe from the container to the total volume $V_B$ of the container 11, such that $p/at$ is in any event greater than $(1+k):(1-1)$ and preferably at least double it. Fulfilling this requirement is therefore necessary so that after opening the valve 13 the compressed air can force the cleaning fluid 34 through the filter candles 7. When the compressed air feeds the cleaning fluid through the drainage pipe 14 and the feedpipe 12 into the outlet upper chamber 4 and forces it out of there through the filter candles 7, its volume extends from its original volume $V_B-V_R$ to the volume $V_F+V_B$ and the pressure of the compressed air falls corresponding to this expansion in volume. In order that, after supplying the cleaning fluid to the filter candles, the compressed air still has sufficient pressure to force the cleaning fluid through the filter candles, the above conditions must be fulfilled. In order to avoid too high an end pressure $p$ of the compressed air in the container 11, it is preferable to choose a charging factor $q$ of the container 11 with the cleaning fluid 34 which is not too high. The factor $q$ ought to be less than 0.5. A preferable range for this factor is, by way of example, from 0.2 to 0.3. If a set quantity of cleaning fluid 34 is required for carrying out the cleaning operation, the volume $V_B$ is then to be made to correspond to the required amount of cleaning fluid and the selected charging factor or a container suitably larger than the container 11 is to be used. Furthermore, in order to attain not too high a final pressure $p$ of the compressed air in the container 11, the volume $V_B$ of the container 11 ought preferably to be greater than the volume $V_F$ of the total outlet side, chamber 4, of the filter apparatus, including the feedpipe 12 from the container 11. It is an advantage to avoid too high a final pressure $p$ of the compressed air in the container 11 because firstly an expensive, thick-walled construction of the container 11 can thus be avoided and furthermore the compressed air unit does not have to supply too high pressures. By way of example, the choice can be so made that the final pressure $p$ of the compressed air in the container is greater than 3.5 atm. and the charging factor $q$ is smaller than 0.5 and that, for the container 11, a container is used whose total volume $V_B$ is greater than twice the volume $V_F$ of the total outlet side of the filter apparatus, including the feedpipe 12 from the container, and which maintains an internal excess pressure of more than 2.5 atm.

In the case where the cleaning fluid is brought to excess pressure by being heated to a temperature above its boiling point at normal pressure by means of a heating device, not shown in FIG. 1, the container 11 can be completely filled with cleaning fluid, i.e., in this case a container is only necessary whose volume is equal to the volume of the quantity of cleaning fluid required for carrying out the cleaning operation. With this method of subjecting the cleaning fluid to excess pressure, a considerably smaller container 11 can be employed. In this case, water can suitably be used as the cleaning fluid, which should preferably be heated to a temperature above 140° in order to attain a sufficient pressure to pass through the filter candles 7. The gaseous medium supplying the heated cleaning fluid from the container 11 to the filter apparatus via the feedpipe 12 is, in this case, formed from water vapor which forms when the valve 13 is opened for carrying out the cleaning operation and consequently the pressure of the water declines and thus a part of the water is evaporated in the container 11.

The method of subjecting the cleaning fluid, in particular, water, to excess pressure by heating it to a temperature above its boiling point at normal pressure has the additional advantage that the heated cleaning fluid has a sterilizing and bactericidal effect. Moreover, the cleaning effect attainable through a highly heated fluid is as a rule greater than the cleaning effect attainable by a cleaning fluid at normal temperature.

After the above-mentioned preparations have been made during or even before the emptying of the filter apparatus, the shut-off valve 13 in the feedpipe 12 is opened for carrying out the cleaning operation. This shutoff valve 13 is preferably a flap valve or other valve, the cross section of whose opening can be made much bigger in a relatively short time. With the opening of the shutoff valve 13, the cleaning fluid 34 is displaced through the feedpipe 12 to the outlet upper chamber 4 of the filter apparatus. The cleaning fluid flowing out at the orifice 12b is thereby distributed by the deflector plate 18 on to the entire surface on the upper side of the wallplate 6. Finally, the cleaning fluid which is still under pressure flows through the openings 9 or 10 penetrating the wallplate 6 to the insides 8 of all the filter candles 7.

As is apparent from FIGS. 2 and 3, the filter candles 7 are now suitably provided with means for distributing the cleaning fluid, flowing from the outlet upper chamber 4 to the insides 8 of the candles, through the openings 9 or 10 to the inner surfaces 37 of the permeable filtering parts 38 of the candles.

With the embodiment of such a filter candle shown in FIG. 2, these means consist of a nozzle-shaped constriction 39 attached to the outlet side of the candle end and a deflector plate 40 attached at a distance from but below this constriction 39 in the inside 8 of the candle, which plate 40 deflects the cleaning fluid, flowing through the nozzle-shaped constriction 39 in the form of a jet, toward all sides in the direction of the inner walls of the candles 7. An annular slot 41 is provided between the deflector plate 40 and the inner wall 37 of the candle, through which the cleaning fluid distributed by the deflector plate 40 can run along the inner wall 37 of the candle. The fluid running down the inner wall 37 of the candle then forms a film of fluid over the entire surface 37, which film is then forced through the inner wall 38 of the candle. In order to attain a good distribution of the cleaning fluid, the deflector plate 40 is preferably arranged to be between 2 and 5 cm.

beneath the upper edge of the permeable filtering part 38 in the candle.

With the embodiment of a filter candle shown in FIG. 3, the means for distributing the cleaning fluid consist of a nozzle tip 42 attached to the end of the candle at the outlet side so as to project into the interior of the candle, with a number of nozzle apertures 43 in the direction of the inner wall of the candle surrounding the nozzle tip 42. The filter candle 7 is thus attached to the wallplate 6 by means of a screw 45 penetrating the wallplate 6 and screwed into the end plate 44 at the outlet side of the candle, which screw 45 projects into the inside of the candle by an attachment 42 at the front which forms the nozzle tip and is provided with a blind hole 47 extending from the top 46 of the screw to the attachment 42, as well as with nozzle openings 43 issuing radially from the blind hole 47 in the region of the attachment 42. With this method of fixing the filter candles 7, the holes 47 serving for fixing the filter candles 7 can, in comparison to the embodiment of the filter candles 7 shown in FIG. 2, be made smaller in the wallplate 6 or have a smaller diameter. As a result of this smaller diameter of the holes 47, the wallplate 6 can also be made somewhat thinner in the case of equal stress.

Furthermore, with the embodiment illustrated in FIG. 3, the filter candles 7 can be removed at the bottom whereby the need for head room can be reduced with a corresponding construction of the tank. In using the form of filter candles shown in FIG. 3, the effect of the nozzle tip 42 is similar to the effect of the nozzle-shaped constriction 39 together with the deflecting plate 40, in the case of the form of filter candles 7 shown in FIGS. 2, i.e., the cleaning fluid flowing in through the blind hole 47 from the upper chamber at the outlet side of the filter apparatus is distributed through the nozzle orifices 43 on to the inner wall of the candles surrounding the nozzle tip and then runs down along the inner wall 37 of the candle and forms a film of fluid which covers the inner wall of the candle and is then forced through the candles wall 38.

If the cleaning fluid, which after opening the shutoff valve 13 has flowed into the upper chamber at the outlet side of the filter apparatus and then was distributed by the deflector plate 18, has then flowed into the filter candles 7 and formed a film of fluid on the inner walls 37, FIGS. 2 and 3, thereof, the compressed air, or the cleaning fluid vapor, both still under excess pressure, passes into the candles through the orifices 9 or 10, FIGS. 2 and 3, and the fluid covering the inner walls 37 of the candles in the form of a film is forced toward the outside through the candle walls 38. The sludge attached to the outside of the filter candles is thereby loosened and slides away into the funnel-shaped base of the tank 3. Finally, the cleaning fluid forced out of the filter candles 7 toward the outsides by the further action of the compressed air, or cleaning fluid vapor, builds up in the funnel formed by the base of the tank 3. The remaining compressed air, or surplus cleaning fluid vapor, then penetrates the walls 38 of the filter candles 7. In order that the pressure in the lower chamber 5 does not rise too high while the cleaning fluid and the compressed air, or the cleaning fluid vapor, flow through the walls of the filter candles in this lower chamber at the inlet side of the filter apparatus, or in order that no appreciable counterpressure forms in the lower chamber during this backflow, the gas pipe 29 remains open, as previously mentioned, so that a part of the compressed air entering the lower chamber 5, or a part of the cleaning fluid vapor, can escape through the gas pipe 29.

After the cleaning fluid is forced through the filter candles 7 and has collected in the funnel-shaped base of the tank, the valves 27 are opened and air is blown through the nozzles 26 into the lower chamber 5 at the outlet side of the filter apparatus. The nozzles 8 are located beneath the level of the cleaning fluid which has collected in the funnel-shaped base 3 of the tank. Therefore, the injection of air through the nozzles 26 causes an intensive whirling movement of the fluid, so that the cakes of sludge still held together after being loosened from the filter candles, which may even still be partly tubular in shape, mix with the cleaning fluid to form a paste or slurry.

The valve 28 is then closed and additional air is supplied through the nozzles 26. The air in the tank 1 above the paste or slurry is thereby subjected to excess pressure. The valve 21 is then opened and, as a result of the excess pressure in the tank 1, the paste or slurry is discharged into the container 23 via the feedpipe 22. In this connection, it should be noted that the feedpipe 22 can preferably run vertically up to the valve 21 and the feedpipe 25 then opens in a horizontal direction into this vertical limb of the pipe 22. Complete emptying of the paste or slurry into the container 23 is enhanced by such a vertical position of the section of the pipe 22 up to the valve 21. After the paste or slurry has been discharged into the container, the valve 21 is closed again. Furthermore, the valves 27 are also closed and the valve 30 is opened in order to release the excess pressure present in the tank 1.

After the resultant conclusion of the main cleaning operation, smaller and smaller sludge residues may be present in the filter apparatus and can now be removed by final cleaning following the main cleaning. For this purpose, the lower chamber at the inlet side of the filter apparatus is filled with water, either through the inlet pipe 25 or the feedpipe 33, until the level of the water has reached the wallplate 6. The valves 27 are then opened again and air is blown into the water via the nozzles 26. The injected air causes a strong whirling motion of the water and the walls of the tank, the outsides of the filter candles 7 and the underside of the wallplate 6 are very effectively freed from any sludge which may still be adherent. The cleaning effect may be advantageously enhanced by an intermittent, vibratory or pulsating injection of air. Instead of the turbulent motion of the water caused by injecting air through the nozzles 26, a vibrating motion of the water can advantageously be produced by a pulsator or vibrator installed in the lower chamber 5 at the inlet side. For this purpose, the vibrator or pulsator can be attached, by way of example, to the funnel-shaped base 3 of the tank. After the whirling and/or vibrating of the water has been produced, the water is again drained out of the tank through the pipe 22. This water, which is now only mixed with small residues of sludge, can be discharged directly into the waste water system. While this final cleaning step is being carried out, the container 23 housing the slurry or paste of cleaning fluid and sludge is disconnected from the pipe 22 and the pipe 22 is connected to the waste water system. The changeover can be made by means of a two-way cock which, in FIG. 1, would be arranged in the pipe 22 between the valve 21 and the container 23. Throughout the entire final cleaning step, the valve 30 remains open. While the lower chamber at the inlet side of the filter apparatus is being filled with water, the air present and also the air injected through the nozzles 26 can pass out of the tank 1 through the pipe 31.

After the water is removed at the end of the final cleaning step, the valve 21, which was opened for that purpose, is again closed. The valves 27 and 30 are closed again at the same time and the filter apparatus is now in a clean condition, ready for carrying out a further filtering process.

The advantages of the present process, as well as of the apparatus for carrying it out, are summarized in the following:

The main advantage of the process is that the sludge loosened from the filter candles can be removed from the filter apparatus in the form of a slurry or paste containing relatively little fluid. This leads to considerable reductions in costs, which would otherwise have to be expended in decanting a relatively large amount of water mixed with the sludge, as for example, with known cleaning processes.

A further important advantage which arises from the present process is that the apparatus for carrying out the process is constructed with a substantially smaller headroom than the device for carrying out the known process, because a voluminous dome on the outlet side of the filter apparatus, required for carrying out the known process and necessitating a relatively large headroom for the filter apparatus, can be dispensed with. The overall height is important, particularly in the case of installation of the filter apparatus, e.g., in breweries, since the buildings for housing the filter apparatus very often have lesser roof heights, having been used for older filter units of relatively smaller overall height.

It is further advantageous, in the case of the particular embodiment of the present process where the cleaning fluid, e.g., water, is subjected to excess pressure by being heated to a temperature above its boiling point at normal pressure, that the heated cleaning fluid and, more particularly, the hot vapor additionally provides a sterilizing effect.

A further important advantage arises in connection with the present process in the use of filter candles which are provided with means for distributing the cleaning fluid, which flows into the interior of the candles from the outlet side of the filter apparatus during the cleaning operation, on to the inner surfaces of the permeable, filtering parts of the candles, e.g., corresponding to FIGS. 2 and 3. Through this distributing means, first of all the sludge cake in the upper part of the candle is loosened, which has proved particularly favorable, because a complete separation of the sludge cake is attainable with relatively little cleaning fluid. Finally, the embodiment of the filter candles shown in FIG. 3 gives rise to another advantage, in that the wallplates 6 used can be less thick and the filter candles can be removed at the bottom which, in connection with a corresponding construction of the tank, provides an additional possibility for reducing the overall height of the filter apparatus.

I claim:

1. A process for cleaning a filter apparatus having at least one filter, comprising: first fully emptying said filter, maintaining the pressure at the inlet side of said filter during the entire emptying step higher than at the outlet side of said filter by means of introducing air under pressure into the filter apparatus at the inlet side, thereafter subjecting a predetermined amount of cleaning liquid to pressure in a separate container and passing said liquid through said filter into the outlet side thereof, in a direction opposite to that used in filtration, by means of a gaseous medium also under pressure, said predetermined amount of cleaning liquid being distributed along the inside wall of said filter through a distribution means provided within said filter and constructed and arranged to form a complete liquid layer over said inside wall, said gaseous medium causing a rapid increase in pressure within the inside of said filter and causing said cleaning liquid to be pressed through said filter thereby freeing the inlet side of said filter from any sludge buildup thereon, said cleaning liquid and thereafter said gaseous medium flowing through said filter to said inlet side thereof whereby only said predetermined amount of cleaning liquid needed to be distributed along said inside wall is necessary to free the sludge therefrom, and said predetermined amount being relatively small compared to the volume of said filter apparatus with only said amount being mixed with the freed sludge.

2. A process according to claim 1, in which, before carrying out the cleaning operation, introducing air under pressure into the filter apparatus at the inlet side, in order to discharge fluid still at the inlet side which is to be filtered, as well as fluid already filtered which is at the outlet side, opening a pipe on the outlet side with its orifice at least near the base of the outlet side by means of a first valve, so that already filtered fluid is displaced from the filter apparatus, opening an outlet pipe on the inlet side with its orifice at least near the base of the inlet side by means of a second valve, so that fluid to be filtered but still at the inlet side is displaced from the filter apparatus, air introduced at the inlet side escaping through the first valve while the second valve is being opened so that a higher pressure is maintained at the inlet side than at the outlet side.

3. A process according to claim 1, in which, after the filter has been cleaned, removing the sludge, released from the inlet side of the filter by the cleaning fluid, from the base of the inlet side of the filter apparatus by a pipe attached to the base, by means of a gas under pressure in the inner volume of the apparatus.

4. A process according to claim 1, in which, after the filter has been cleaned, removing the sludge, released from the inlet side of the filter by the cleaning fluid, from the base of the inlet side of the filter apparatus by a pipe attached to the base, by means of a gas under pressure in the inner volume of the apparatus, and in which the gas is at least partially air which is supplied to the filter apparatus for mixing the sludge with the cleaning fluid at the inlet side beneath the level of the cleaning fluid accumulated at the base of the inlet side of the apparatus.

5. A process according to claim 1, in which the cleaning fluid and gaseous medium are supplied from the container by a feedpipe to the outlet side of the filter, and in which the filling of the separate container, with the feedpipe closed, is carried out at least partially with the cleaning fluid, heating the cleaning fluid to a temperature above its boiling point at normal pressure and then opening the feedpipe so that the pressure of the cleaning fluid falls, a part of the cleaning fluid being vaporized in the separate container and this vapor then forms the gaseous medium used for supplying the cleaning fluid to the filter apparatus.

6. A process according to claim 5, in which water is used as the cleaning fluid and the gaseous medium is formed from the water vapor.

7. A process according to claim 5, in which water is used as the cleaning fluid and the gaseous medium is formed from the water vapor, and wherein the water is heated in the separate container to a temperature exceeding 140° C.

8. A filter apparatus, comprising at least one filter, a separate container connected by a feedpipe to the outlet side of the filter apparatus, a stop valve in the feedpipe, and means for causing a gaseous medium under excess pressure to displace a cleaning fluid from the container into the filter apparatus, the filter being a candle filter with a plurality of filter candles and the filter candles are provided with means for distributing the cleaning fluid, which during the cleaning operation flows from an outlet side of the filter apparatus into the interior of the candles, on the inner surface of the permeable and filtering parts of the candles, the distributing means are provided for each candle comprising a nozzle-shaped constriction at the outlet from the candle and a deflecting body attached at a distance from the constriction inside the candle, the body serving to deflect cleaning fluid, which, during the cleaning operation, flows through the constriction in the form of a jet to all sides in the direction of the inner walls of the candle, and an annular closed loop-gap provided between the deflecting body and the inner wall of the candle, down through which the cleaning fluid distributed along the inner wall of the candle by the deflecting body, can run, and in which the deflecting body is a round and flat deflecting plate mounted at 2 to 5 cm. from the edge of the permeable filtering part of the candle and perpendicular to the axis of the candle.

9. A filter apparatus, comprising at least one filter, a separate container connected by a feedpipe to the outlet side of the filter apparatus, a stop valve in the feedpipe, and means for causing a gaseous medium under excess pressure to displace a cleaning fluid from a container into the filter apparatus, the filter being a candle filter with a plurality of filter candles and the filter candles are provided with means for distributing the cleaning fluid, which during the cleaning operation flows from an outlet side of the filter apparatus into the interior of the candles, on the inner surface of the permeable and filtering parts of the candles, the distributing means for each candle comprise a nozzle tip at the outlet side of the end of the candle and projecting into the candle, the tip having a number of nozzle openings directed toward the surrounding part of the inner wall of the candle.

10. A filter apparatus, comprising at least one filter, a separate container connected by a feedpipe to the outlet side of the filter apparatus, a stop valve in the feedpipe, and means for causing a gaseous medium under excess pressure to displace a cleaning fluid from the container into the filter apparatus, the filter being a candle filter with a plurality of filter candles and the filter candles are provided with means for distributing the cleaning fluid, which during the cleaning operation flows from an outlet side of the filter apparatus into the interior of the candles, on the inner surface of the permeable and filtering parts of the candles, the filter candles are attached to a wallplate, located between the inlet and outlet sides of the filter apparatus, by means of a screw penetrating the wallplate and screwed into the end plate at the outlet side of the candle, said screw projecting into the candle with an attachment at the front which forms the nozzle tip and is provided with a blind hole extending from the top of the screw to the attachment, as well as with nozzle openings issuing radially from the blind hole in the region of the attachment.

* * * * *